(12) United States Patent
Meyer

(10) Patent No.: US 10,495,809 B2
(45) Date of Patent: Dec. 3, 2019

(54) LIGHT GUIDE FOR LIGHTING A DISPLAY DEVICE

(71) Applicant: ETA SA Manufacture Horlogere Suisse, Grenchen (CH)

(72) Inventor: Vincent Meyer, Biel/Bienne (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 0 days.

(21) Appl. No.: 15/275,780

(22) Filed: Sep. 26, 2016

(65) Prior Publication Data

US 2017/0168229 A1 Jun. 15, 2017

(30) Foreign Application Priority Data

Dec. 14, 2015 (EP) ...................... 15199765

(51) Int. Cl.
*F21V 7/04* (2006.01)
*F21V 8/00* (2006.01)

(52) U.S. Cl.
CPC ........... *G02B 6/0088* (2013.01); *G02B 6/009* (2013.01); *G02B 6/0035* (2013.01); *G02B 6/0055* (2013.01)

(58) Field of Classification Search
CPC .. G02B 6/0088; G02B 6/0035; G02B 6/0053; G02B 6/0011; F21W 2106/00; B60Q 3/62; B60Q 3/64
See application file for complete search history.

(56) References Cited

U.S. PATENT DOCUMENTS

| | | | |
|---|---|---|---|
| 5,957,561 A | 9/1999 | Ono et al. | |
| 2005/0185389 A1* | 8/2005 | Henriet | G02B 6/0018 362/23.15 |
| 2006/0268581 A1* | 11/2006 | Hsu | G02B 6/0081 362/633 |
| 2009/0257241 A1* | 10/2009 | Meinke | B60Q 1/2669 362/546 |
| 2012/0224382 A1* | 9/2012 | Petersohn | G02B 6/0051 362/471 |
| 2012/0307523 A1* | 12/2012 | Oya | G02B 6/0088 362/612 |
| 2013/0176317 A1* | 7/2013 | Li | G02B 6/0035 345/501 |
| 2014/0063847 A1* | 3/2014 | Sakamoto | G02B 6/0031 362/609 |
| 2014/0119044 A1* | 5/2014 | Kaltenrieder | G02B 6/0058 362/551 |

(Continued)

OTHER PUBLICATIONS

French Preliminary Search Report dated May 19, 2016 in European Application 15199765, filed on Dec. 14, 2015 ( with English Translation of Categories of Cited Documents).

*Primary Examiner* — Matthew J. Peerce
(74) *Attorney, Agent, or Firm* — Oblon, McClelland, Maier & Neustadt, L.L.P.

(57) ABSTRACT

Light guide into which is injected the light produced by a light source optically coupled to the light guide, wherein the light guide includes a first central portion made of a transparent material in which are structured light extractors, via which the light produced by the light source is extracted from the light guide, and a second peripheral portion made of a light absorbing material and surrounding the central portion, wherein the peripheral portion is integral with the central portion.

13 Claims, 4 Drawing Sheets

(56) References Cited

U.S. PATENT DOCUMENTS

2014/0286029 A1\* 9/2014 Mueller .................. B60Q 3/82
362/511
2015/0062942 A1\* 3/2015 Shiraishi ................ B60K 37/06
362/490

\* cited by examiner

PRIOR ART

LIGHT GUIDE FOR LIGHTING A DISPLAY DEVICE

This application claims priority from European Patent Application No. 15199765.7 filed Dec. 14, 2015, the entire disclosure of which is incorporated herein by reference.

FIELD OF THE INVENTION

The present invention concerns a light guide for lighting a display device. In particular, the present invention concerns such a light guide used for lighting a liquid crystal display device.

BACKGROUND OF THE INVENTION

The information displayed by a display device, such as a liquid crystal display device, is difficult to read in low light conditions. This is why lighting such display devices by means of a light source was considered very early on. The most basic known solutions consist simply in arranging a point light source, such as a filament bulb or light emitting diode, at the back of the liquid crystal display device. Such solutions are, however, unsatisfactory since they do not ensure homogenous illumination of the display surface of the liquid crystal display device. Indeed, a more intense halo of light is perceptible to the user through the liquid crystal display device at the place where the point light source is located.

To overcome this problem, it has been proposed to illuminate liquid crystal display devices by means of a light guide. A light guide is a component of limited thickness made of a transparent material, typically a plastic material, whose dimensions substantially match those of the liquid crystal display device to be illuminated and into which is injected the light produced by at least one light source optically coupled to the light guide. Optical microstructures called light extractors, whose function is to uniformly extract, across the entire surface of the light guide, the light injected into the light guide by the light source, are structured in at least one of the upper or lower surfaces of the light guide.

An example of a transparent light guide of the type briefly described above is represented in FIG. 1, annexed to the present Patent Application. Designated as a whole by the general reference number 1, the light guide is, for example, of generally parallelepiped shape and comprises an upper surface 2 and a lower surface 4 connected to each other by a lateral edge 6. It also comprises one or more holes 8 for the mounting thereof onto a support piece (not shown) and a pair of studs 10 for securing a printed circuit sheet 12 serving as support for a point light source 14, such as a light emitting diode.

Light guide 1, which is made of transparent plastic material, comprises optical prisms 16 commonly called light extractors, which, in the example represented in FIG. 1, are structured in upper surface 2 of light guide 1. The purpose of these light extractors 16 is to upwardly extract the light injected into light guide 1 by point light source 14 optically coupled to light guide 1. Such a light guide 1 is thus intended to light from below a display device, such as a liquid crystal display cell (not shown).

In order for the illumination of the display device to be as bright and homogenous as possible, any leakage of light must therefore be prevented as far as possible. It has been observed that, in the particular case where a light guide is used to light from below a liquid crystal display device housed inside a watch case, the light that leaks through the sides of the light guide may be reflected onto some of the watch components and diffused upwards towards the watch dial. Undesired light spots thus appear which impair the aesthetic appearance of the watch.

To overcome this problem, upper surface 2 of light guide 1 is divided into a peripheral surface 18 and a useful surface 20 which substantially matches the surface of the display device to be illuminated and is surrounded by peripheral surface 18. As represented in FIG. 1, peripheral surface 18 is coated with a layer 22 of a light absorbing material, such as a black paint, in order to prevent the light produced by light source 14 from leaking at that location. Likewise, studs 10 for securing printed circuit sheet 12, which serves as a support for point light source 14, are integral with light guide 1 and are therefore transparent. They should also be coated with light absorbing paint. Finally, again for the purpose of limiting light leakage as far as possible, lateral edge 6 may be chamfered. Indeed, as it is difficult to deposit absorbent paint on lateral edge 6 of light guide 1, the edge is chamfered. It is clear that chamfering lateral edge 6 reduces the surface through which light can escape laterally.

The operations intended to reduce light leakage in a light guide of the type described above are, however, difficult to implement on an industrial scale. Layer 22 of absorbent material is typically deposited by pad printing, which is long and complex especially as it must be ensured that light guide 1 is precisely positioned when layer 22 of absorbent material is deposited. Indeed, care must be taken not to deposit absorbent material on useful surface 20 of light guide 1, through which escapes the light intended to illuminate the display device. Moreover, chamfering lateral edge 6 does not completely prevent light leakage.

SUMMARY OF THE INVENTION

It is an object of the present invention to find a solution to the aforementioned drawbacks, in addition to others, by providing a light guide that is simpler to produce industrially and overcomes problems of light leakage.

To this end, the present invention concerns a light guide into which is injected a light produced by a light source optically coupled to the light guide, the light guide comprising a first central portion made of a transparent material in which light extractors are structured, via which the light produced by the light source is extracted from the light guide, and a second peripheral portion made of a light absorbing material and surrounding the central portion, the peripheral portion being integral with the central portion.

According to a complementary feature of the invention, the central portion of the light guide comprises an upper surface and a lower surface which extend at a constant distance from each other, the upper and lower surfaces being connected to each other by a lateral edge, with light extractors structured in at least one of the upper or lower surfaces.

According to another feature of the invention, the peripheral portion comprises one or more holes for mounting the light guide on a support piece and at least one stud for securing a printed circuit sheet serving as a support for a point light source.

As a result of these features, the present invention provides a light guide wherein light leakage is eliminated. Indeed, since the transparent central portion of the light guide which is used to extract the light injected into the light guide by the light source is surrounded by a peripheral portion consisting of a light absorbing solid material, light cannot escape laterally from the light guide. The illumination of the light device to be lighted by the light guide according to the invention is thus more intense and more homogeneous than in the case of light guides of the prior art. Moreover, since all the elements of the light guide (peripheral light guide portion, holes for mounting the light guide, studs for securing the printed circuit sheet) are made in one-piece with the aid of a solid material that actually absorbs light, the pad stamping operations are avoided, which makes substantial savings possible in terms of time and production costs.

BRIEF DESCRIPTION OF THE DRAWINGS

Other features and advantages of the present invention will appear more clearly from the following detailed description of an example embodiment of a light guide according to the invention, this example being given solely by way of non-limiting illustration with reference to the annexed drawing, in which.

DETAILED DESCRIPTION OF ONE EMBODIMENT OF THE INVENTION

The present invention proceeds from the general inventive idea that consists in making a light guide for illuminating a display device in two elements, namely a first central element made of a transparent material through which the light injected into the light guide exits, and a second peripheral element made of a material that actually absorbs light within itself which surrounds the central element and which carries means for mounting the light guide on a support element and the means for securing a printed circuit sheet carrying a light source. The presence of this peripheral light absorbing element around the transparent central portion from which light is extracted prevents any light leakage through the sides of the light guide and dispenses with the painting operations of the prior art which are time-consuming and expensive.

Figure 1:
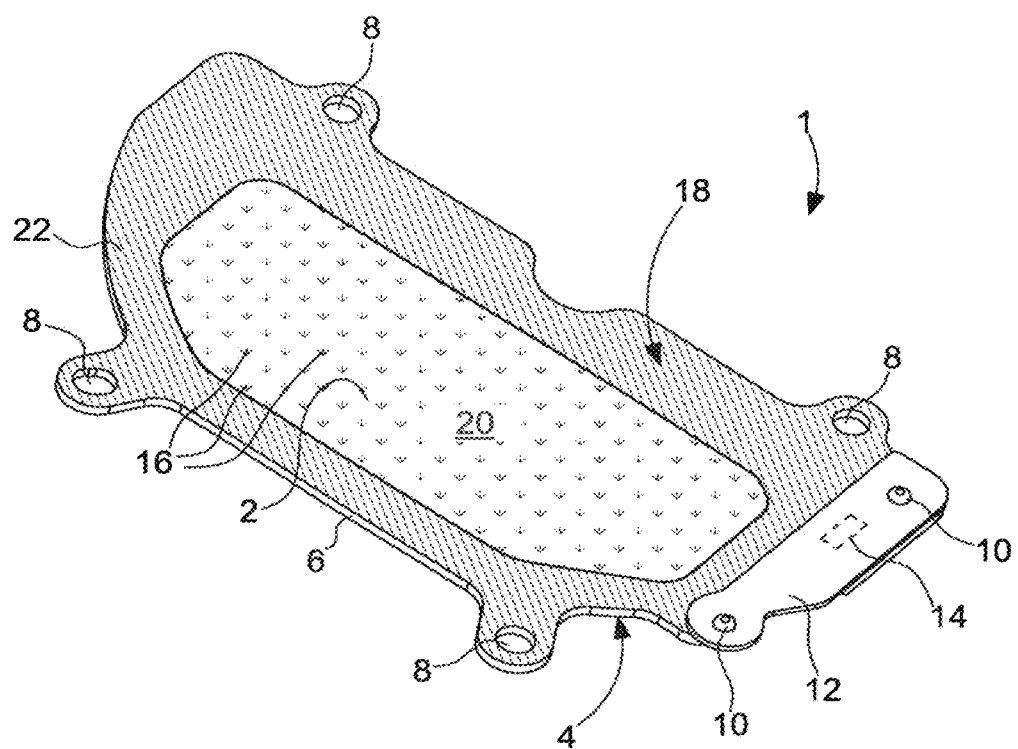
FIG. 1, already cited, is a perspective view of a light guide of the prior art.
Figure 2:
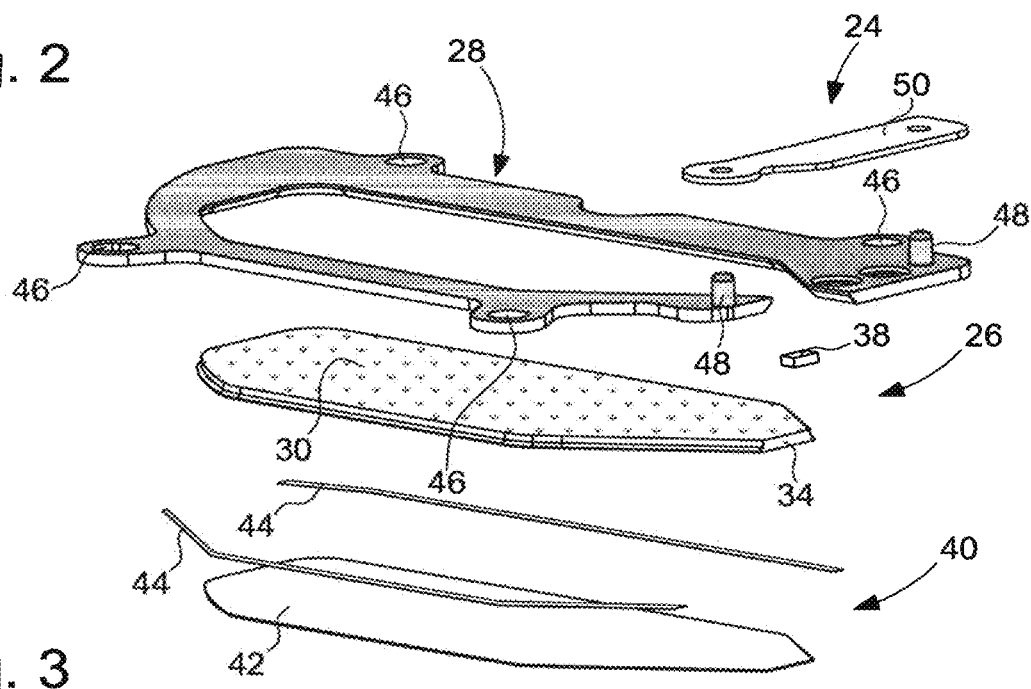
FIG. 2 is a perspective view, in the disassociated state, of a first embodiment of a light guide according to the invention.
Figure 3:
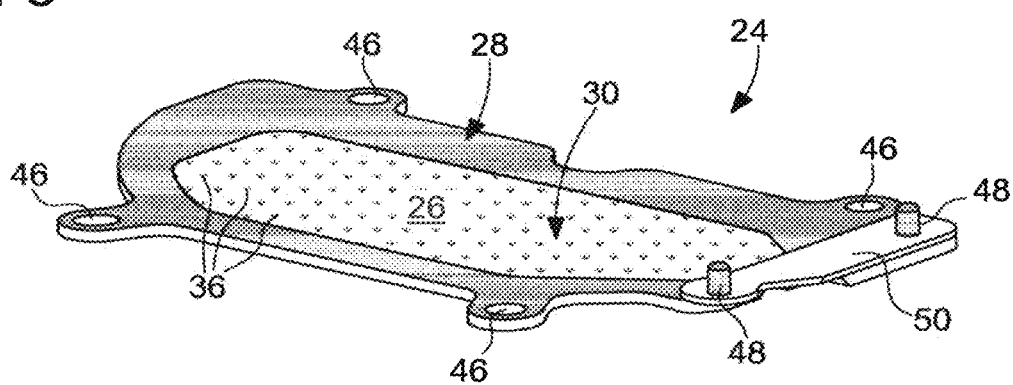
FIG. 3 is a perspective view, in the assembled state, of the light guide of FIG. 2.
Figure 4:
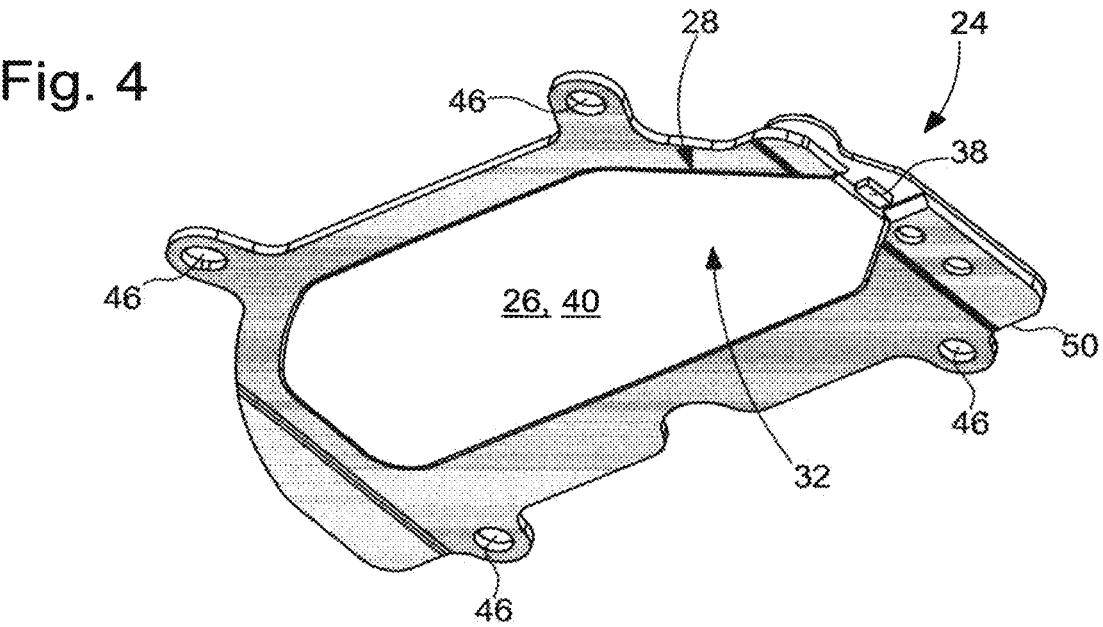
FIG. 4 is a bottom view of the light guide of FIG. 3.

An example of a light guide according to the present invention is represented in an exploded perspective view in FIG. 2 annexed to the present Patent Application. Designated as a whole by the general reference number 24, the light guide is, by way of non-limiting example, of generally parallelepiped shape and comprises a transparent central portion 26 and an opaque peripheral portion 28 made of a light absorbing material and surrounding the central portion, the opaque peripheral portion 28 being integral with transparent central portion 26. If the transparent central portion 26 and opaque peripheral portion 28 are made of plastic material, they may be made integral with each other, for example by bonding or thermowelding.

Transparent central portion 26 of light guide 24 comprises an upper surface 30 and a lower surface 32 which extend at a constant distance from each other, upper surface 30 and lower surface 32 being connected to each other by a lateral edge 34. In the example represented in the drawing, upper surface 30 and lower surface 32 are flat and extend parallel to each other. It goes without saying that according to an embodiment that is not illustrated in the drawing, upper surface 30 and lower surface 32 could be curved and separated from each other by a constant distance so as to fit a display device of the same profile.

Light guide 24 according to the invention is intended to light a display device (not represented) from below. To this end, the purpose of a plurality of light extractors 36 structured in upper surface 30 is to upwardly extract the light injected into light guide 24 by a light source 38, such as a light emitting diode, optically coupled to light guide 24. It will be understood, of course, that this example embodiment is given purely by way of illustration and that light extractors may be structured in one and/or the other of upper surface 30 and lower surface 32 of light guide 24. In particular, light extractors 36 are structured in lower surface 32 of central portion 26 of light guide 24 when the latter is used to light a display device from above.

According to a complementary feature of the invention, the surface of central portion 26 of light guide 24, which is opposite to the surface of central portion 26 of light guide 24 through which the light produced by light source 38 escapes, is provided with a reflective layer 40. This reflective layer 40 may be directly structured on the surface of central portion 26 of light guide 24 opposite to the surface through which the light escapes, or be formed, for example, by a film 42 secured to the surface of central portion 26 of light guide 24 by means of one or two pieces of double-side adhesive tape 44.

According to another feature of the invention, opaque peripheral portion 28 comprises one or more holes 46 for mounting light guide 24 on a support piece (not represented) and at least one stud 48 (two in the example represented) for securing a printed circuit sheet 50 serving as a support for light source 38.

Figure 5:
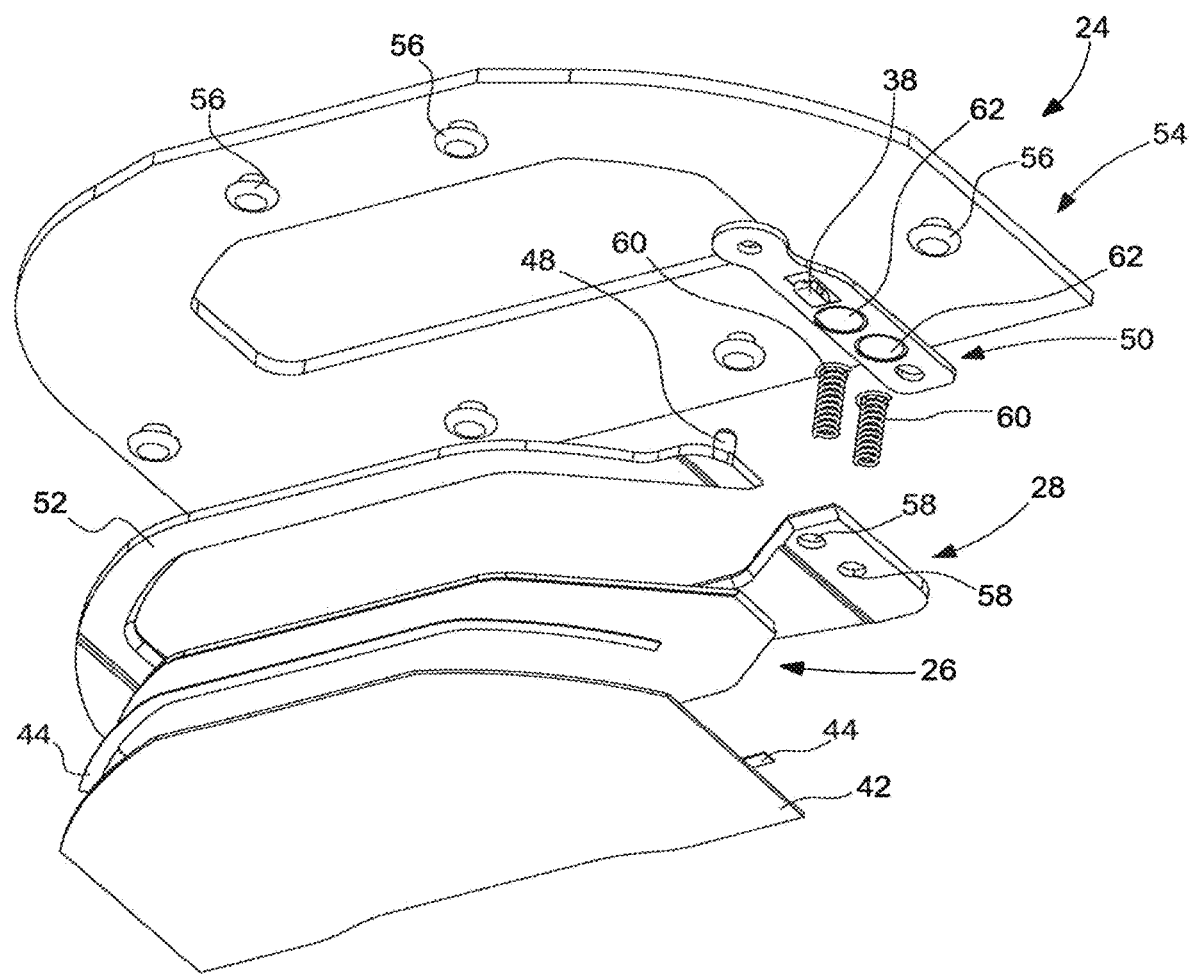
FIG. 5 is an exploded perspective view of a second embodiment of a light guide according to the invention wherein a support piece is provided with securing studs which will be thermally crushed to hold the light guide.
Figure 6:
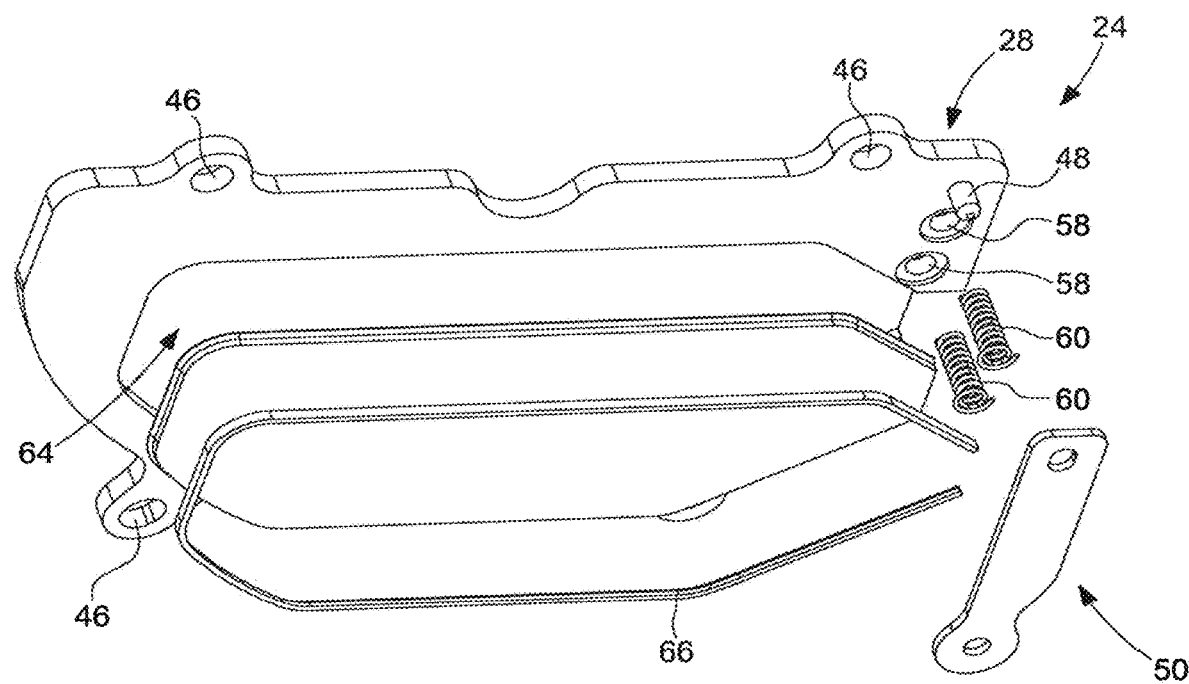
FIG. 6 is an exploded perspective view of a third embodiment of a light guide according to the invention wherein the peripheral portion of the light guide delimits a cavity for receiving the central portion.

It goes without saying that this invention is not limited to the embodiment that has just been described and that various simple modifications and variants can be envisaged by those skilled in the art without departing from the scope of the invention as defined by the annexed claims. In particular, as represented in FIG. 5, peripheral portion 28 of light guide 24 has an outer edge 52 via which light guide 24 is secured to a support piece 54, for example a plate or a bridge of a timepiece movement, which is provided with one or more securing studs 56 able to be thermally deformed to hold light guide 24 against support piece 54 via outer edge 52 of peripheral portion 28. Peripheral portion 28 of light guide 24 is pierced with two holes 58 for the passage of two contact springs 60 that rest on two contact pads 62 of printed circuit sheet 50 to electrically connect light source 38 to an electrical power source (not illustrated). According to yet another embodiment of the invention illustrated in FIG. 6, peripheral portion 28 of light guide 24 delimits a cavity 64 which receives central portion 26 of light guide 24, if necessary, with the insertion of a reflective layer between central portion 26 and the bottom of cavity 58. An adhesive line 66 disposed on the periphery of central portion 26 allows the latter to be joined to peripheral portion 28 of light guide 24.

LIST OF PARTS

Light guide 1
Upper surface 2

Lower surface 4
Lateral edge 6
Holes 8
Studs 10
Printed circuit sheet 12
Point light source 14
Optical prisms 16
Peripheral surface 18
Useful surface 20
Layer 22
Light guide 24
Transparent central portion 26
Opaque peripheral portion 28
Upper surface 30
Lower surface 32
Lateral edge 34
Light extractors 36
Light source 38
Reflective layer 40
Film 42
Adhesive tape pieces 44
Holes 46
Stud 48
Printed circuit sheet 50
Outer edge 52
Support piece 54
Securing studs 56
Holes 58
Contact springs 60
Contact pads 62
Cavity 64

What is claimed is:

1. A timepiece movement, comprising:
a light guide into which is injected a light produced by a light source optically coupled to the light guide, the light guide comprising:
a first central portion made of a transparent material in which are structured light extractors, each of the light extractors comprising an optical prism via which the light produced by the light source is extracted from the light guide, the central portion including an upper surface and a lower surface opposite to the upper surface, the upper surface and the lower surface being connected to each other by a lateral edge, and the light extractors are positioned in at least one of the upper or lower surfaces to extract light from the light guide via the at least one of the upper or lower surfaces in which the light extractors are positioned, a second peripheral portion made of a material that absorbs light, and the second peripheral portion includes a gap such that the peripheral portion surrounds the lateral edge of the central portion except for a portion of the lateral edge though which the light produced by the light source is injected;
a support piece that extends across the gap in the peripheral portion, the light source being attached to a bottom surface of the support piece such that the light source is positioned in the gap of the peripheral portion to inject the light into the central portion, wherein the support piece is a printed circuit sheet including contact pads,
wherein the peripheral portion is attached to the central portion to be made integral with the central portion;
the timepiece movement further comprising:
a timepiece support piece, the light guide being secured to a bottom of the timepiece support piece, and
springs that extend through holes in the peripheral portion of the light guide and directly contact the contact pads to electrically connect the light source to an electrical power source.

2. The light guide according to claim 1, wherein the upper surface and the lower surface extend at a constant distance from each other.

3. The light guide according to claim 1, wherein the peripheral portion of the light guide delimits a cavity that receives the central portion of the light guide.

4. The light guide according to claim 2, wherein the peripheral portion of the light guide delimits a cavity that receives the central portion of the light guide.

5. The light guide according to claim 1, wherein the upper or lower surface of the central portion of the light guide, which is opposite to the lower or upper surface of the central portion of the light guide through which the light produced by the light source escapes, is provided with a reflective layer.

6. The light guide according to claim 2, wherein the upper or lower surface of the central portion of the light guide, which is opposite to the surface lower or upper of the central portion of the light guide through which the light produced by the light source escapes, is provided with a reflective layer.

7. The light guide according to claim 3, wherein the upper or lower surface of the central portion of the light guide, which is opposite to the lower or upper surface of the central portion of the light guide through which the light produced by the light source escapes, is provided with a reflective layer.

8. The light guide according to claim 4, wherein the upper or lower surface of the central portion of the light guide, which is opposite to the lower or upper surface of the central portion of the light guide through which the light produced by the light source escapes, is provided with a reflective layer.

9. The light guide according to claim 1, wherein the peripheral portion includes one or more holes for mounting the light guide on a support piece and at least one stud for securing a printed circuit sheet serving as a support for the light source.

10. The light guide according to claims claim 1, wherein the peripheral portion of the light guide has an outer edge via which the light guide is secured to a support piece which is provided with at least one thermally deformed securing stud to hold the light guide against the support piece via an outer edge of the peripheral portion thereof.

11. The light guide according to claims claim 1, wherein the peripheral portion is attached directly to the central portion to be made integral with the central portion by bonding or thermowelding.

12. The light guide according to claims claim 1, wherein the second peripheral portion consists of the solid material that absorbs light.

13. The light guide according to claim 1, wherein the gap in the peripheral portion renders the peripheral portion discontinuous such that the peripheral portion does not encircle the central portion.

* * * * *